United States Patent
Yeh

(10) Patent No.: US 9,338,692 B2
(45) Date of Patent: May 10, 2016

(54) PORTABLE ELECTRONIC ACCESS DEVICE AND WIRELESS DATA NETWORK SYSTEM

(71) Applicant: Hung-Yao Yeh, Taipei (TW)

(72) Inventor: Hung-Yao Yeh, Taipei (TW)

( * ) Notice: Subject to any disclaimer, the term of this patent is extended or adjusted under 35 U.S.C. 154(b) by 311 days.

(21) Appl. No.: 13/935,058

(22) Filed: Jul. 3, 2013

(65) Prior Publication Data

US 2014/0022896 A1   Jan. 23, 2014

(30) Foreign Application Priority Data

Jul. 19, 2012 (TW) .............................. 101125950 A

(51) Int. Cl.
*H04W 28/12* (2009.01)
*H04W 12/08* (2009.01)
*H04W 84/12* (2009.01)

(52) U.S. Cl.
CPC .............. *H04W 28/12* (2013.01); *H04W 12/08* (2013.01); *H04W 84/12* (2013.01)

(58) Field of Classification Search
CPC ..... H04W 12/08; H04W 28/12; H04W 84/12; H04W 48/17; H04W 48/18; H04W 48/20; H04W 60/005; H04W 16/00; H04W 16/06; H04W 16/18; H04W 16/20; H04W 16/225; H04W 36/0072; H04W 36/0077; H04W 36/08; H04W 36/10; H04W 36/14; H04W 16/14; H04L 12/2854; H04L 12/2856; H04L 12/2858; H04L 12/2889; H04L 29/06306; H04L 29/08126; H04L 29/08927; H04L 2012/642

USPC ................ 370/252, 277, 310, 328–329, 341, 370/395.2, 395.53, 431, 230; 726/7, 22–25; 455/422.1, 425, 434, 436–437, 443, 455/446–450, 454, 463

See application file for complete search history.

(56) References Cited

U.S. PATENT DOCUMENTS

| | | | |
|---|---|---|---|
| 8,625,488 B1 * | 1/2014 | Gogate et al. ................. | 370/328 |
| 2005/0169209 A1 * | 8/2005 | Miu et al. ...................... | 370/328 |
| 2007/0010248 A1 * | 1/2007 | Dravida et al. ............ | 455/435.1 |
| 2008/0058031 A1 * | 3/2008 | Deprun ......................... | 455/574 |
| 2008/0235376 A1 * | 9/2008 | Prytz et al. .................... | 709/225 |
| 2010/0232400 A1 * | 9/2010 | Patil et al. ..................... | 370/337 |
| 2013/0086665 A1 * | 4/2013 | Filippi et al. ..................... | 726/7 |
| 2015/0207800 A1 * | 7/2015 | Jitkoff et al. ................. | 370/252 |

FOREIGN PATENT DOCUMENTS

TW   200423643   11/2004

* cited by examiner

*Primary Examiner* — Mohamed Kamara
(74) *Attorney, Agent, or Firm* — Foster Pepper PLLC; Richard A. Koske; P. G. Scott Born

(57) ABSTRACT

A portable electronic access device, with a first access point module for a first user to communicate with a wireless data network, includes a second access point module and a control module. The control module via a first user command or remote signal can set the security domain of the second access point module and control the second access point module to start or close, so that at least one second user can log in the second access point module. Accordingly, an intranet is provided for inter-communications between users or a dynamic hotspot of the wireless data network is provided to relieve the congestion caused by the sudden increase of data users.

11 Claims, 3 Drawing Sheets

PORTABLE ELECTRONIC ACCESS DEVICE AND WIRELESS DATA NETWORK SYSTEM

PRIORITY CLAIM

This application claims the benefit of the filing date of Taiwan Patent Application No. 101125950, filed Jul. 19, 2012, entitled "PORTABLE ELECTRONIC ACCESS DEVICE AND WIRELESS DATA NETWORK SYSTEM," and the contents of which is hereby incorporated by reference in its entirety.

FIELD OF THE INVENTION

The present invention relates to a portable electronic access device and a wireless data network system, and more particularly to a portable electronic access device and a wireless data network system capable of relieving wireless network congestion caused by the increase of data users.

BACKGROUND OF THE INVENTION

An access point (AP) or a wireless access point is a device that allows wireless devices (e.g., personal computers, notebooks or mobile smart phones) to connect to a network using Wi-Fi, or related standards. An access point may be a transceiver that transmits/receives data and connects users to other users within the network, and also can serve as the point of interconnection between the WLAN and a fixed wire network. However, considering the convenience for using, a lightweight design has been an important factor in the development of the portable wireless access point.

Nowadays, with the development of wireless technology, more and more public venues have wireless data network system for providing Wi-Fi access. In general, the wireless data network is provided by a wireless base station, and each user can connect to the wireless base station via their portable electronic devices within the signal coverage area thereof. The wireless data network can be a mobile data network or a wireless local area network (WLAN). Since each portable electronic device can severally communicate with the wireless network base station, as the number of electronic device trying to attach to the same base station increases, all of the data transmission therebetween and the resulting lower signal-to-interference-plus-noise ratio (SINR) may lead to wireless network congestion when the users are within a densely crowded space or other public venues. Therefore, to ensure quality of service, the number of attached electronic devices allowed is often limited.

Although the network congestion mentioned above can be improved by additional access points or hotspots (each access point can serve multiple users within a defined network area), these stationary access devices may increase the cost of wireless data networks due to the stationary access devices are often in idle state. Accordingly, how to develop a portable electronic access device and a wireless data network system capable of relieving wireless network congestion is the primary topic in this field.

SUMMARY OF THE INVENTION

Therefore, in order to improve the problem described previously, an aspect of the present invention is to provide a new type and improved of portable electronic access device.

According to an embodiment of the present invention, the portable electronic access device has a mobile network interface module and a first access point module for a first user to communicate with a wireless data network; moreover, the portable electronic access device further comprises a second access point module and a control module, wherein the control module is coupled with the second access point module. The control module can set the security domain of the second access point module and control the second access point module to start or close in accordance with a control signal. When the second access point module starts to operate, the second access point module can allow at least one second user to log in. The mobile network interface module is coupled with the first access point module, the second access point module, and the control module, so as to configure the traffic between access point modules and wireless data network.

In this embodiment, the portable electronic access device can provide not only a personal access point for the first user, but also a public access point for other user through the second access point module. Therefore, at least one second user can connect and communicate with a wireless data network via the second access point module, and thereby relieving wireless network congestion. Furthermore, the second access point module can create an internal wireless local area network (WLAN) for second users to log in and access data; that is to say, at least one second user can connect with the first user for data interchange via the second access point module.

Another aspect of the present invention is to provide a new type and improved of wireless data network system.

According to another embodiment of the present invention, the wireless data network system can provide a wireless data network in a space. The wireless data network system comprises a remote control device and a portable electronic access device, wherein the remote control device can send a remote control instruction to the portable electronic access device according to a default condition or network administrator instruction. The portable electronic access device comprises a mobile network interface module, a first access point module, a second access point module, and a control module coupled with the second access point module. More specifically, the first access point module is used for a first user to communicate with the wireless data network, and the control module can set the security domain of the second access point module and control the second access point module to operate (e.g. start or close) in accordance with the remote control instruction transmitted from the remote control device. When the second access point module starts to operate, the second access point module can allow at least one second user to log in and connect to an internal wireless local area network (WLAN) or a wireless data network.

In the embodiment, the wireless data network system can drive the portable electronic access device to provide a public access point for other user through the second access point module. Accordingly, at least one second user can connect and communicate with a wireless data network via the second access point module, and thereby relieving wireless network congestion. Besides, the second access point module can create an internal wireless local area network (WLAN) in the space, so that the second users can log in and access data with the internal wireless local area network (WLAN); that is to say, at least one second user can connect with the first user for data interchange via the second access point module.

Many other advantages and features of the present invention will be further understood by the detailed description and the accompanying sheet of drawings.

BRIEF DESCRIPTION OF THE DRAWINGS

To facilitate understanding, identical reference numerals have been used, where possible to designate identical elements that are common to the figures.

DETAILED DESCRIPTION

Figure 1:
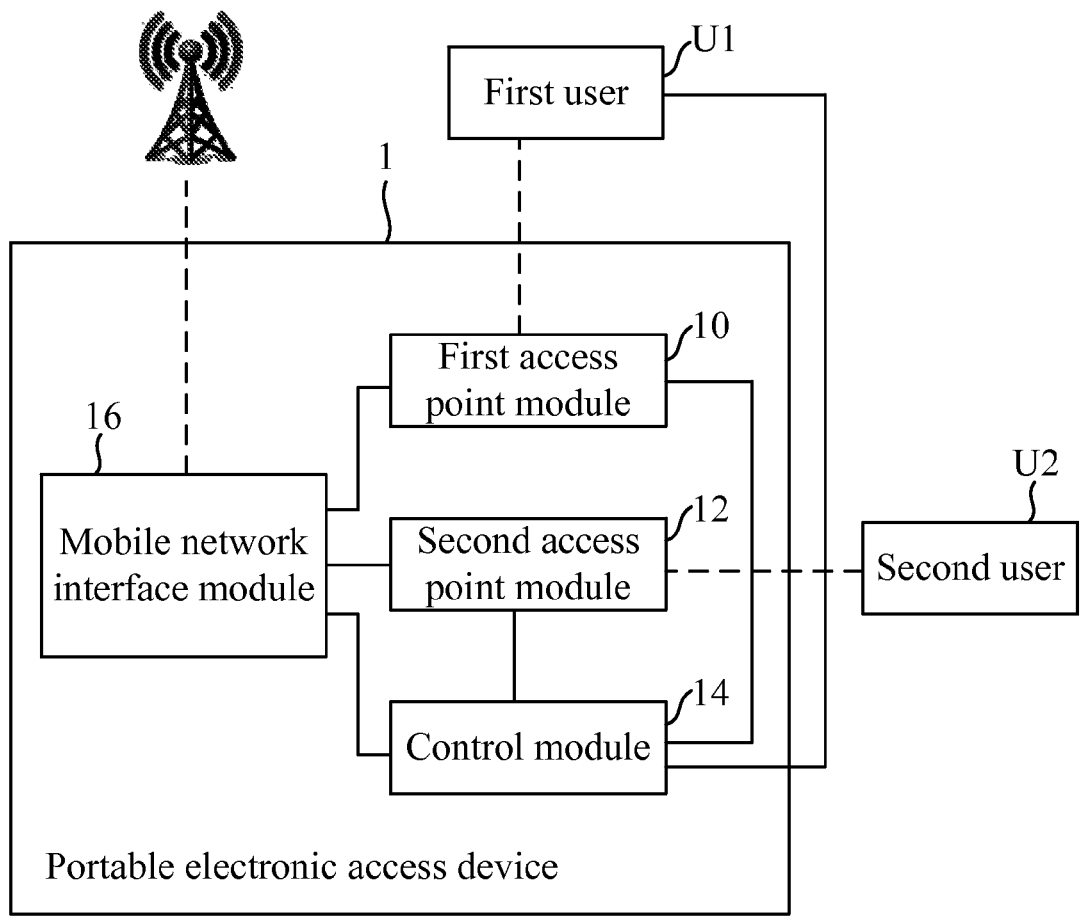
FIG. 1 is a functional block diagram illustrating a portable electronic access device according to an embodiment of the invention.

Please refer to FIG. 1. FIG. 1 is a functional block diagram illustrating a portable electronic access device according to an embodiment of the invention. In actual application, the portable electronic access device 1 is a portable access point (AP) or other electronic apparatus with built-in access point such as notebooks, personal digital assistants (PDA) or mobile smart phones; therefore, the holder of this electronic apparatus and their entitled users can connect and communicate with nearby wireless network.

As shown in FIG. 1, the portable electronic access device 1 comprises a first access point module 10, a second access point module 12, a control module 14 and a mobile network interface module 16, wherein the control module 14 is coupled with the second access point module 12, so that the control module 14 can set the security domain of the second access point module 12 and control the second access point module 12 to start or close. The mobile network interface module 16 is coupled with the first access point module 10, the second access point module 12, and the control module 14, so as to configure the traffic between access point modules and wireless data network, and allow respective and simultaneous communications of the first access point module 10 and the second access point module 12 to the wireless data network. Through mobile network interface module 16, the first access point module 10 can be used for a first user U1 to communicate with nearby wireless data network, more specifically mobile data network; to be noticed, the first user U1 is the holder of the portable electronic access device 1 or other users entitled to access the first access point module 10. Additionally, the control module 14 can also be coupled with the first access point module 10, so that the first user U1 can control the first access point module 10 via the control module 14. In practice, the first user U1 can access the first access point module 10 to connect to wireless data network through another electronic apparatus (e.g., mobile smart phone or notebook). In another embodiment, the first user U1 can directly connect to wireless data network via the electronic access device 1; for example, the first user U1 can use a mobile smart phone (electronic access device 1) with built-in access point (the first access point module 10) to connect and communicate with wireless data network.

Figure 2:
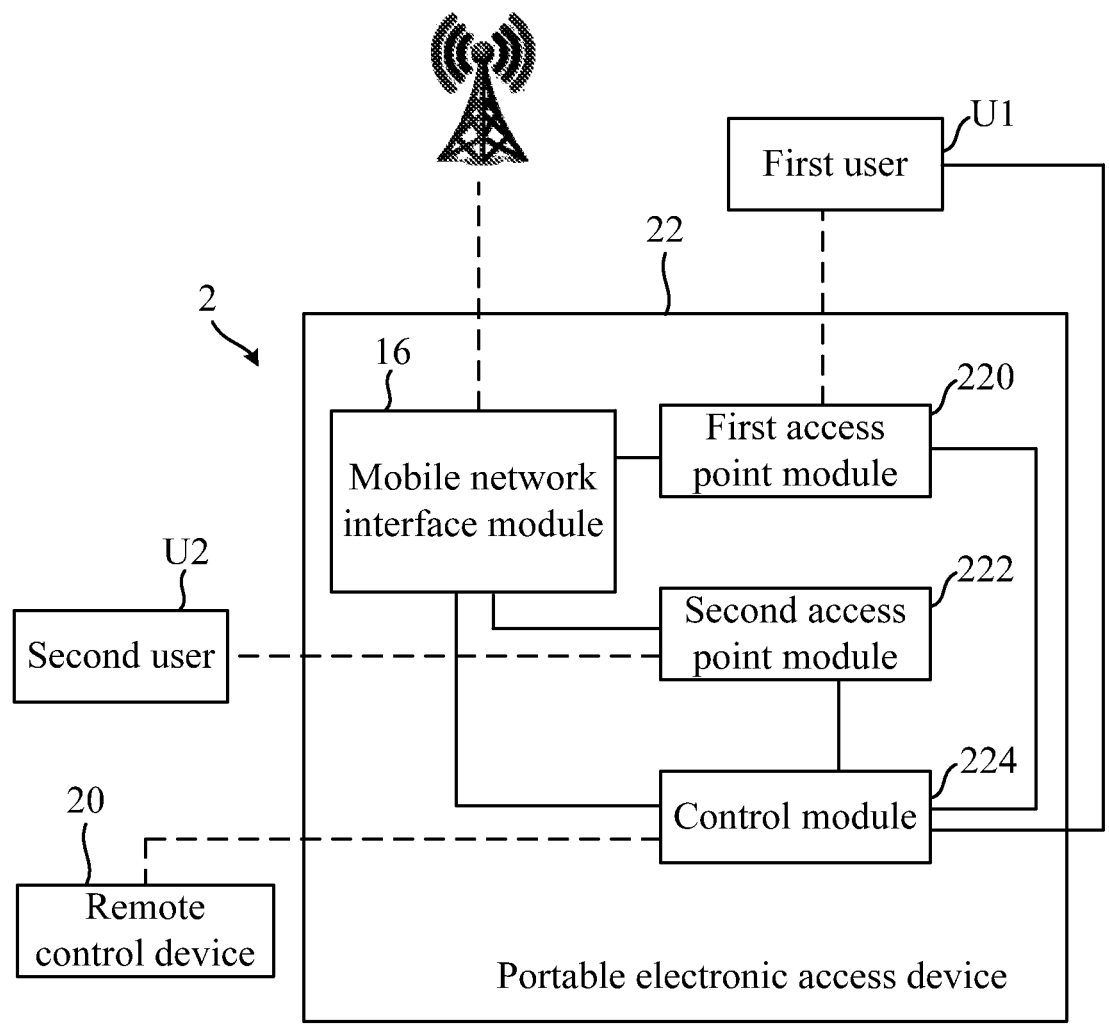
FIG. 2 is a schematic diagram illustrating a wireless data network system according to another embodiment of the invention.

To be noticed, the solid line in FIG. 1 and FIG. 2 (described later) represents a physical connection between the first user U1 and the control module 14 while the dashed line represents the first user U1 has a communication connection with the first access point module 10 via wireless transmission. As described in the previous paragraph, the first user can also use the portable access device 1 to directly connect to wireless data network; thereby, in this situation, the dashed line between the first user U1 and the first access point module 10 in FIG. 1 and FIG. 2 are not utilized. On the other hand, if the first user adopts wireless transmission to substitute for the traditional wired transmission with the control module, the connection relationship therebetween may be indicated by dashed line. Similarly, the solid lines in each figure represent a physical connection while the dashed lines in each figure represent a wireless connection.

The control module 14 of the portable electronic access device 1 can control the operation of the second access point module 12 in accordance with a control signal, and simultaneously set the security domain of the second access point module 12. Thereby, the security domain of the second access point module 12 can be performed in a variety of settings in accordance with different control signals. Moreover, the security domain thereof can comprise: (1) connecting the second access point module 12 to wireless data network, or (2) creating an internal wireless local area network (WLAN).

When the second access point module 12 is turned on and set to communicate with wireless data network, the at least one second user U2 may be allowed to log in or connect to the second access point module 12, and then further to communicate with wireless data network. In actual application, the second user U2 can adopt wireless transmission to connect to the second access point module 12 through another electronic apparatus, thus the portable electronic access device 1 can unify the data packet address of pluralities of second users U2 to reduce the contention conflict; in addition, the portable electronic access device 1 can also transmit data to wireless data network by data buffering, and simultaneously, the data packets can be received from wireless data network and further to transmit to the corresponding second users U2.

When the second access point module 12 is turned on and set to create an internal wireless local area network (WLAN), the at least one second user U2 may be allowed to log in to the second access point module 12 and further to connect to the internal wireless local area network (WLAN), so as to communicate with the first user U1 or other second users U2. In particular, the second access point module 12 can provide one of the functions of connecting to wireless data network or internal wireless local area network (WLAN) for all the second users U2, but the invention is not limited to this and may also provide different second users U2 with the functions of connecting to wireless data network or internal wireless local area network (WLAN) respectively.

In the embodiment, the first access point module 10 and the second access point module 12 are used for different users to connect to wireless data network or internal wireless local area network (WLAN) respectively. In order to distinguish the two access point modules, the first access point module 10 and the second access point module 12 have different Service Set Identifiers (SSID) and different login authentications (e.g., password) respectively, therefore the second users U2 cannot connect to the first access point module 10. Besides, the first access point module 10 and the second access point module 12 in this embodiment are distinguished by functional modules, but the invention is not limited to this, it can also be achieved by turning on different virtual softAPs or using a different set of Internet Protocol address (IP address) in the same channel.

However, when the second access point module 12 is turned on, the portable electronic access device 1 might consume more power. In order not to affect the interests of first user U1, the control module 14 has a reminder function to remind the first user U1 that the electric quantity of the portable electronic access device 1 is below a certain threshold (e.g., 20%), and further to control the second access point module 12 to be turned off to save power. Or, the control module 14 can notify the wireless data network provider first and then control the second access point module 12 to be turned off to seek other access point in advance.

More specifically, when the second users U2 connect and communicate with wireless data network via the second access point module 12, the first access point module 10 and the second access point module 12 may enable to shield the information and/or identities of the first user U1 and the at least one second user U2 from each other, so as to safeguard the privacy of each user. Moreover, when the second access point module 12 functioned as internal WLAN, the first user U1 can view and examine the information of all electronic apparatus connected with the second access point module 12 (i.e., the second users U2) such as the number and/or identification name thereof, and can set the permissions of the electronic apparatus (the second user U2) to log in to the second access point module 12, so that the first user U1 can monitor the state of the portable electronic access device 1 in time. When the portable electronic access device 1 needs to process a large amount of data transmission (e.g., video data), the control module 14 may control the second access point module 12 to be closed, so as to maintain the connection quality for the first user U1. Furthermore, the first user U1 can optionally close the second access point module 12 directly.

In detail, the first user U1 can input the control instruction via an input unit (not shown in the figures) of the portable electronic access device 1, and then the control unit 14 can stop the operation of the second access point module 12 according to the control instruction. Likewise, the first user U1 can also choose whether to open and share the second access module 12 or not, for example, when the control module 14 receives a remote control instruction, the first user U1 can decide whether to agree to turn on the second access module 12 first, and then the control module 14 may control the second access point module 12 to start or close in accordance with the determination of the first user U1.

Please refer to FIG. 2. FIG. 2 is a schematic diagram illustrating a wireless data network system 2 according to another embodiment of the invention. In actual application, the wireless data network system 2 can be constructed in a space (e.g., restaurants or other activity venues), and provide a wireless data network within the space. The space generally refers to the application environment of the invention. As shown in FIG. 2, the wireless data network system 2 comprises a remote control device 20 and a portable electronic access device 22, wherein the detailed description of the portable electronic access device 22 is in essence the same with the portable electronic access device 1 described above, thus it needs not to be elaborated here.

In the embodiment, the remote control device 20 can be a server or a wireless base station for emitting a wireless signal source in the wireless data network system 2, or can be a device independent from the wireless base station. The remote control device 20 can send a remote control instruction to the portable electronic access device 22 according to a default condition, so that the control module 224 of the portable electronic access device 22 may be enabled to control the second access point module to start or close, wherein the default condition comprises the position, motion path, number of nearby hotspots, battery power level, and/or signal coverage area of the portable electronic access device.

However, with more people using wireless network in the space mentioned above, the wireless networks may become congested; in this situation, the remote control device 20 or the wireless base station described above may calculate and figure out which portable electronic access devices 22 in this space is suitable as a public access point according to the default condition, and then further to send a remote control instruction to the portable electronic access device 22. For the sake of clarity, FIG. 2 shows only one portable electronic access devices 22, but in actual application, the invention is not limited to this, the number of the portable electronic access devices can be determined according to the default condition. For example, if there are ten portable electronic access devices dispersed in the space, the remote control device can decide to send the remote control instruction to seven of them in accordance with the position and the signal coverage area of each portable electronic access device; the signal coverage area can cover the specified space. On the other hand, when the remote control device 20 or the wireless base station described above figures out that the public access point need not to be turned on, a remote control instruction may be sent to the control module 224 to turn off the second access point module 222, so as to save electricity of the portable electronic access devices 22 in this manner.

In the embodiment, the first user U1 and the at least one second user U2 can communicate with wireless data network via the first access point module 220 and the second access point module 222 respectively. It is necessary to note that the first user U1 and the second users U2 are located within the signal coverage area of the portable electronic access devices 22. That is to say, if a second user leaves the signal coverage area of the portable electronic access device, the electronic apparatus of the second user may automatically search nearby second access point module of other portable electronic access devices so as to connect to wireless data network again. Likewise, the second access point module 222 of the portable electronic access devices 22 in this embodiment can be turn off to ensure the interests and privacy of first user U1; when the portable electronic access devices 22 receives a remote control instruction, the first user U1 can decide whether to agree to turn on the second access point module 222 first, or furthermore, the first user U1 can also determine and set the permissions of the specific second users U2 to log in to the second access point module 222.

Since the second access point module 222 can allow a plurality of second users U2 to log in, the second access point module 222 can unify and transmit the data packet of these second users U2 to wireless data network, and then the data packets can be received from wireless data network and further to transmit to the corresponding second users U2. Thus, the second users U2 can communicate with wireless base stations via the portable electronic access devices 22 to relieve wireless network congestion and improve the utilization efficiency of network. In the embodiment, the owner of the portable electronic access devices 22 is a first user U1; that is to say, the personal access points or hotspots may have the embedded public access points or hotspots, so that the wireless data network system 2 would not incur extra hardware charges to set up additional access points or hotspots.

Likewise, the control module 224 can control the second access point module 222 to start providing internal wireless local area network in the space according to the control instruction of the first user U1. In actual application, while there are at least one portable electronic access devices in the space and at least one second access point modules being turned on, each one of the electronic apparatus in the space can be connected with each other to form an internal wireless local area network. The second user U2 can log in to the second access point module 222 and access data with the internal wireless local area network; that is to say, the second user U2 can connect with the first user U1 or other second user U2 for data interchange via the second access point module 222. To be noticed, the second access point module 222 can create an internal wireless local area network in accordance with a remote control instruction of the remote control device 20 or a control instruction issued by the first user U1.

Figure 3A:
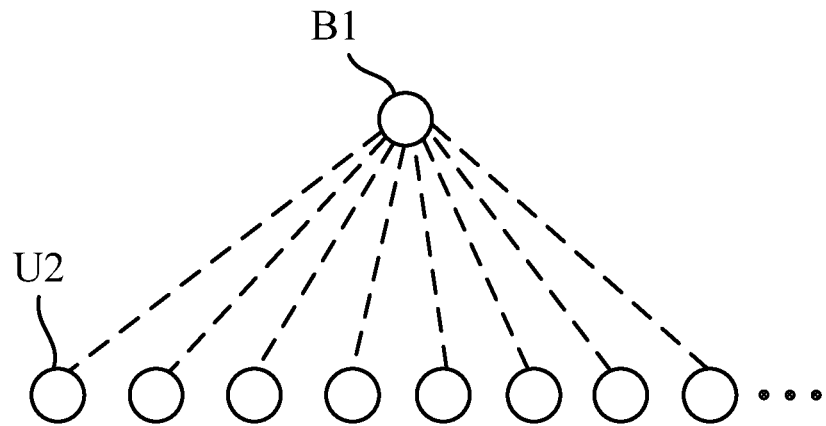
FIG. 3A is a schematic diagram illustrating the connection between the second users and the wireless data network in prior art.
Figure 3B:
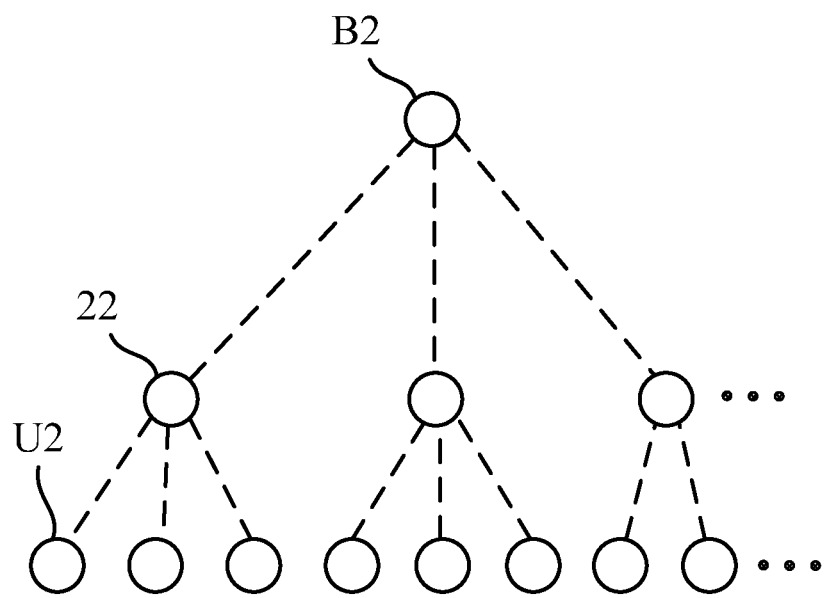
FIG. 3B is a schematic diagram illustrating the connection between the second users and the wireless data network according to FIG. 2.

Please refer to FIGS. 3A and 3B. FIG. 3A is a schematic diagram illustrating the connection between the second users U2 and the wireless data network in prior art; and FIG. 3B is a schematic diagram illustrating the connection between the second users U2 and the wireless data network 2 according to FIG. 2. As shown in FIG. 3A, in prior art, the second user U2 should severally communicate with the wireless network base station B1; if there are N number of second users in the space, the wireless network base station B1 has to ensure the signal-to-interference-plus-noise ratio (SINR) and guarantee the quality of data transmission capacity for the second users U2 who are connected, thus the theoretically achievable data throughput and efficiency may be sacrificed and cause the number of the connected users in the space to be lower than N. On the contrary, the portable electronic access devices 22 shown in FIG. 3B can allow the second users U2 to log in and connect to the wireless network base station B2 via the second access point modules 222 thereof; in brief, if there are N number of second users U2 and 10 portable electronic access devices 22 in the space, the second users U2 can be connected to these 10 portable electronic access devices 22 respectively, so that the wireless network base station B2 can significantly improve the signal-to-interference-plus-noise ratio (SINR) and guarantee the right of data transmission contention for only n/10 second users U2 to facilitate data rate control in wireless communication systems; and furthermore, the number of the data packets can be decreased by data buffering and thereby relieve wireless network congestion.

According to the embodiments described above, the invention discloses a portable electronic access device having personal access point module and with a built-in public access point module for other users to communicate with wireless data network. When a user is within a densely crowded space or other public venues, the remote control device of the wireless data network system may send a remote control instruction to turn on the public access point module to relieve wireless network congestion in accordance with the position, motion path, number of nearby hotspots, battery power level, and/or signal coverage area of the portable electronic access device. Furthermore, the public access point module can also create an internal wireless local area network in a space or other public venues, so as to allow the users within the signal coverage area of the portable electronic access device to connect to the internal wireless local area network for data interchange. Since each of the portable electronic access devices belong to individual users, the wireless data network system does not incur extra charges to set up additional access points or hotspots, so as to save the cost of wireless data networks.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

The invention claimed is:

1. A portable electronic access device, with a first access point module for a first user to log in and communicate with a wireless data network, comprising:
   a second access point module, for at least one second user through a wireless electronic apparatus to log in, and both the first access point module and the second access point module serve as WLAN access points;
   a control module, coupled with the second access point module, for setting the security domain of the second access point module and controlling the second access point module to start or close in accordance with a control signal; and
   a mobile network interface module, coupled with the first access point module, the second access point module, and the control module, for configuring and allowing respective and simultaneous communications of the first access point module for the first user and the second access point module for the second user to the wireless data network.

2. The portable electronic access device of claim 1, wherein the control module sets the security domain of the second access point module to connect with the wireless data network, so as to allow at least one second user to log in and connect to the wireless data network.

3. The portable electronic access device of claim 1, wherein the control module sets the security domain of the second access point module to create an internal wireless local area network, so as to allow the at least one second user to log in and connect to the internal wireless local area network.

4. The portable electronic access device of claim 3, wherein the first user can view the information of the at least one second user via the second access point module, and set the permissions of the at least one second user to log in to the second access point module.

5. The portable electronic access device of claim 1, wherein the control signal is a control instruction issued by the first user.

6. The portable electronic access device of claim 1, wherein the control signal is a remote control instruction from the wireless data network.

7. The portable electronic access device of claim 1, wherein the first access point module and the second access point module have different Service Set Identifiers (SSID) and different login authentications respectively.

8. A wireless data network system, for providing a wireless data network in a space, the system comprising:
   a remote control device, used for sending a remote control instruction according to a default condition; and
   a portable electronic access device, comprising:
     a first access point module, for a first user to log in and communicate with the wireless data network;
     a second access point module, for at least one second user through a wireless electronic apparatus to log in, and both the first access point module and the second access point module serve as WLAN access points;
     a control module, coupled with the second access point module, for setting the security domain of the second access point module and controlling the second access point module to start or close in accordance with the remote control instruction; and
     a mobile network interface module, coupled with the first access point module, the second access point module, and the control module, for configuring and allowing respective and simultaneous communications of the first access point module for the first user and the second access point module for the second user to the wireless data network.

9. The wireless data network system of claim 8, wherein the first access point module and the second access point module shield the information of the first user and the at least one second user from each other.

10. The wireless data network system of claim 8, wherein the first access point module and the second access point module have different Service Set Identifiers (SSID) and different login authentications respectively.

11. The wireless data network system of claim 8, wherein the default condition comprises at least one of position, motion path, number of nearby hotspots, battery power level, and signal coverage at least one of position, motion path, number of nearby hotspots, battery power level, and signal coverage area of the portable electronic access device.

* * * * *